(12) United States Patent
Williams et al.

(10) Patent No.: US 9,103,463 B2
(45) Date of Patent: Aug. 11, 2015

(54) PRESSURE BALANCED SOLENOID OPERATED VALVE (75) Inventors: Kevin C. Williams, Wixom, MI (US); Eric Paul Janssen, Howell, MI (US)

(73) Assignee: MAC Valves, Inc., Wixon, MI (US)

( * ) Notice: Subject to any disclaimer, the term of this patent is extended or adjusted under 35 U.S.C. 154(b) by 755 days.

(21) Appl. No.: 13/396,202

(22) Filed: Feb. 14, 2012

(65) Prior Publication Data
US 2013/0207012 A1 Aug. 15, 2013

(51) Int. Cl.
F16K 31/06 (2006.01)

(52) U.S. Cl.
CPC ......... *F16K 31/0658* (2013.01); *F16K 31/0693* (2013.01); *Y10T 137/8667* (2015.04)

(58) Field of Classification Search
CPC .......................... F16K 31/0668; F16K 31/0693
USPC ................ 251/52, 129.07; 137/596.2, 625.65
See application file for complete search history.

(56) References Cited

U.S. PATENT DOCUMENTS

| 3,033,228 | A | | 5/1962 | Mohler |
| 4,679,765 | A | | 7/1987 | Kramer et al. |
| 4,852,853 | A | | 8/1989 | Toshio et al. |
| 5,535,783 | A | * | 7/1996 | Asou et al. ............... 137/625.65 |
| 5,641,148 | A | | 6/1997 | Pena et al. |
| 5,697,342 | A | | 12/1997 | Anderson et al. |
| 5,927,257 | A | * | 7/1999 | Hackett ..................... 123/568.26 |
| 6,129,115 | A | * | 10/2000 | Janssen et al. ........... 137/625.65 |
| 6,328,275 | B1 | | 12/2001 | Yang et al. |
| 6,601,821 | B2 | | 8/2003 | Tyler |
| 6,883,544 | B2 | * | 4/2005 | Kawamura et al. ...... 137/625.65 |
| 7,210,501 | B2 | | 5/2007 | Neff et al |
| 7,717,128 | B2 | | 5/2010 | Pataki |
| 9,022,069 | B2 | * | 5/2015 | Neff et al. ................ 137/601.18 |
| 2006/0027269 | A1 | * | 2/2006 | Neff et al. ................ 137/625.65 |
| 2006/0065315 | A1 | * | 3/2006 | Neff et al. ................ 137/625.65 |
| 2007/0176720 | A1 | * | 8/2007 | Janssen et al. ................ 335/270 |
| 2008/0245427 | A1 | * | 10/2008 | Williams et al. ......... 137/625.25 |
| 2008/0251748 | A1 | * | 10/2008 | Neff et al. ................ 251/129.15 |
| 2009/0212244 | A1 | | 8/2009 | Pfaff et al. |

* cited by examiner

*Primary Examiner* — Matthew W Jellett
(74) *Attorney, Agent, or Firm* — Harness, Dickey & Pierce, P.L.C.

(57) ABSTRACT

A pressure balanced solenoid operated valve includes a solenoid portion having a coil in a coil retainer. A valve member portion defines a body connected to the solenoid portion. A slidable valve member in the body has opposed first and second ends and a shoulder between the ends. The first end with the coil energized is magnetically drawn toward the coil retainer moving the valve member between a valve closed and a valve open position. A pressure equalizing passage extends in the valve member from the second end. An inlet passage communicates a pressurized fluid at a valve inlet port to the pressure equalizing passage. A connecting passage communicates between the pressure equalizing passage and the shoulder. The pressurized fluid in the pressure equalizing passage acts against the second end and equally and oppositely against both the shoulder and the first end in both the open and closed positions.

33 Claims, 6 Drawing Sheets

PRESSURE BALANCED SOLENOID OPERATED VALVE

FIELD

The present disclosure relates to solenoid operated valves having a valve member pressure balanced in both open and closed positions.

BACKGROUND

This section provides background information related to the present disclosure which is not necessarily prior art.

Solenoid operated valves are known which provide control of a fluid such as pressurized air in operating additional equipment such as sorters, packaging machines, food processors, and the like. In order to retain the solenoid operated valve in a closed position when the solenoid is de-energized, biasing members such as springs are used. It is also known, for example in U.S. Pat. No. 4,598,736 to Chorkey, that fluid pressure can be balanced within the valve to reduce a solenoid force required to move a valve member between closed and open positions.

Known pressure balanced solenoid operated valve designs have several drawbacks however. Central passageways through the valve member are commonly provided to assist in equalizing pressure as the valve member displaces. Moisture and dirt as contaminants in the fluid, including contaminants entering at the valve discharge port, can move through the central passageway to the solenoid assembly, which can result in valve sticking, reduced valve power, or delayed operating times.

SUMMARY

This section provides a general summary of the disclosure, and is not a comprehensive disclosure of its full scope or all of its features.

According to several embodiments, a pressure balanced solenoid operated valve includes a solenoid portion having a coil positioned in a coil retainer and a valve member portion having a body connected to the solenoid portion. A valve member is slidably disposed in the body. The valve member includes an armature defining a first end of the valve member, a piston defining a second end of the valve member, and a shoulder positioned between the armature and the piston, the armature when the coil is energized being magnetically drawn toward the coil retainer to move the valve member between a valve closed and a valve open position. A pressure equalizing passage open at the piston and extending internally within the valve member opens proximate the shoulder. A pressurized fluid transferred via the pressure equalizing passage acts against the piston and equally and oppositely against both the shoulder and the armature providing a pressure balanced condition in both the valve closed and valve open positions. The pressurized fluid is present in the pressure equalizing passage in both the valve closed and valve open positions acting to prevent a contaminant moving past the armature into the coil or the coil retainer.

According to further embodiments, a pressure balanced solenoid operated valve includes a solenoid portion having a coil positioned in a coil retainer. A valve member portion defining a body is connected to the solenoid portion. A valve member slidably disposed in the body includes opposed first and second ends and a shoulder between the first and second ends. The first end when the coil is energized is magnetically drawn toward the coil retainer thereby moving the valve member between a valve closed and a valve open position. A pressure equalizing passage extends internally and axially in the valve member from the second end. An inlet passage communicates a pressurized fluid at a valve inlet port to the pressure equalizing passage. A connecting passage provides fluid communication between the pressure equalizing passage and the shoulder, whereby the pressurized fluid delivered via the pressure equalizing passage and the connecting passage acts against the second end and equally and oppositely against both the shoulder and the first end.

According to other embodiments, a pressure balanced solenoid operated valve includes a solenoid portion having a pole piece. A valve member portion includes a valve member slidably disposed in the valve member portion. The valve member has an armature defining a first end of the valve member, a piston defining a second end of the valve member, and a shoulder positioned between the armature and the piston proximate to the armature. A resilient valve element is connected to the valve member between the piston and the shoulder. A pressure equalizing passage extending axially through the valve member from the piston to the shoulder is blocked from extending through the armature by a passage end wall. An inlet passage located between the resilient valve element and the shoulder provides communication between the pressure equalizing passage and a first fluid cavity, whereby after a pressurized fluid enters each of the first fluid cavity and the pressure equalizing passage in the valve closed position, the pressurized fluid is retained in the pressure equalizing passage and the inlet passage in both the valve open and valve closed positions.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
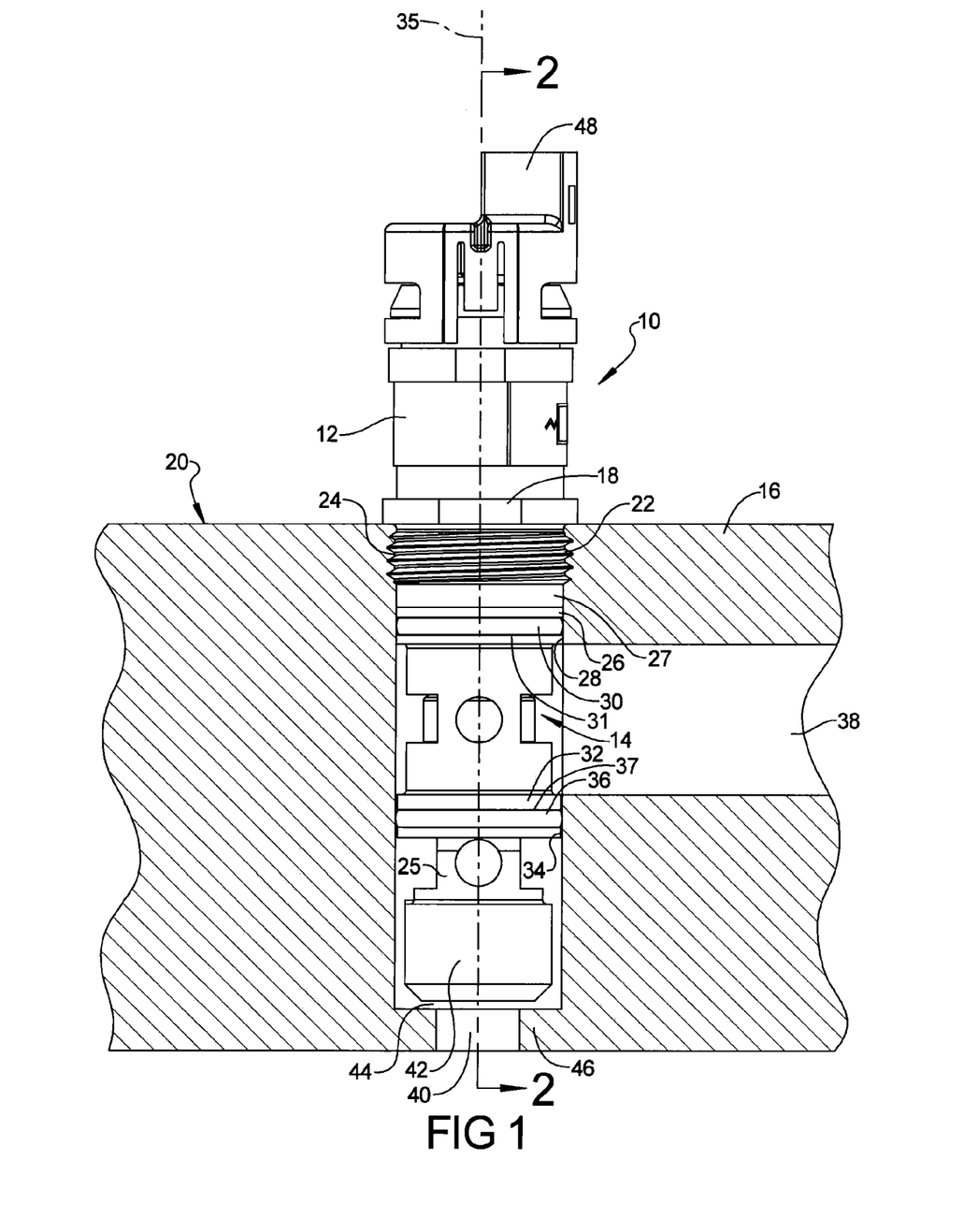
FIG. 1 is a partial cross sectional front elevational view of a pressure balanced solenoid operated valve of the present disclosure mounted in a valve manifold.

Referring to FIG. 1, a solenoid valve assembly 10 includes a solenoid portion 12 connected to a valve member portion 14. Solenoid valve assembly 10 is releasably connected to a manifold 16 using an engagement member 18 which can, for example, have multiple faces adapted for contact by a tool, such as a wrench, which permits an axial torque to be applied to solenoid portion 12 to displace engagement member 18 into direct contact with an external outer wall 20 of manifold 16. Solenoid portion 12 includes a plurality of body threads 22 which are threadably received and engaged with threads of a threaded bore 24 of manifold 16.

Valve member portion 14 includes a body 25 integrally includes a first valve member sleeve 26 which abuts solenoid portion 12. Both first valve member sleeve 26 and an unthreaded portion 27 of solenoid portion 12 are received in a first manifold bore 28 also created in manifold 16 and coaxially aligned with a center axis of threaded bore 24. A first body seal member 30, such as an O-ring or a D-ring, is received in a circumferential slot 31 of first valve member sleeve 26 and creates a fluid boundary by elastic deflection due to contact with the inner bore wall of first manifold bore 28.

Valve member portion 14 also integrally includes a second valve member sleeve 32 which is slidably received in a second manifold bore 34 of manifold 16. First and second manifold bores 28, 34 are both coaxially aligned with respect to a bore longitudinal axis 35. When received in manifold 16, solenoid valve assembly 10 including both solenoid portion 12 and valve member portion 14 are coaxially aligned with respect to bore longitudinal axis 35. Similar to first valve member sleeve 26, second valve member sleeve 32 also includes a second body seal member 36, such as an O-ring or D-ring, positioned in a seal groove or circumferential slot 37 of second valve member sleeve 32. Second body seal member 36 creates a fluid boundary by elastic deflection due to contact with the inner bore wall of second manifold bore 34 and thereby further creates a fluid boundary between both a fluid supply passage 38 and a fluid discharge passage 40 each created in manifold 16.

Valve member portion 14 further integrally includes a third valve member sleeve 42 defining a free end of valve member portion 14 which is slidably received in a third manifold bore 44 of manifold 16. Third valve member sleeve 42 is also coaxially aligned with respect to bore longitudinal axis 35. Third valve member sleeve 42 maintains axial alignment of body 25 with respect to bore longitudinal axis 35. Third manifold bore 44 extends to and ends at a bore end 46 which creates a pressure containment boundary for manifold 16.

Solenoid valve assembly 10 further includes an electrical connection portion 48 extending from solenoid portion 12. Electrical connection portion 48 provides for a power supply connection supplying electrical power to solenoid portion 12. Wiring or a wiring harness (not shown) is commonly connected to electrical connection portion 48 and routed to a power supply (not shown).

Referring to FIG. 2 and again to FIG. 1, valve member portion 14 is releasably threadably engaged to solenoid portion 12 using a plurality of internal body threads 50 of solenoid portion 12 which are threadably engaged by corresponding threads 51 of valve member portion 14 created on a body extension 52 of solenoid portion 12. A valve member 53 is slidably disposed in valve member portion 14 and extends partially into solenoid portion 12. In a valve closed position shown, a biasing member 54, such as a compression spring, provides a biasing force continuously acting to bias valve member 53 in a first displacement direction "A". To move valve member 53 to a valve open position, solenoid portion 12 is energized thereby displacing valve member 53 in an opposite second displacement direction "B" which compresses biasing member 54. Compression of biasing member 54 provides stored energy to return valve member 53 in first displacement direction "A" to the valve closed position when solenoid portion 12 is de-energized.

Figure 2:
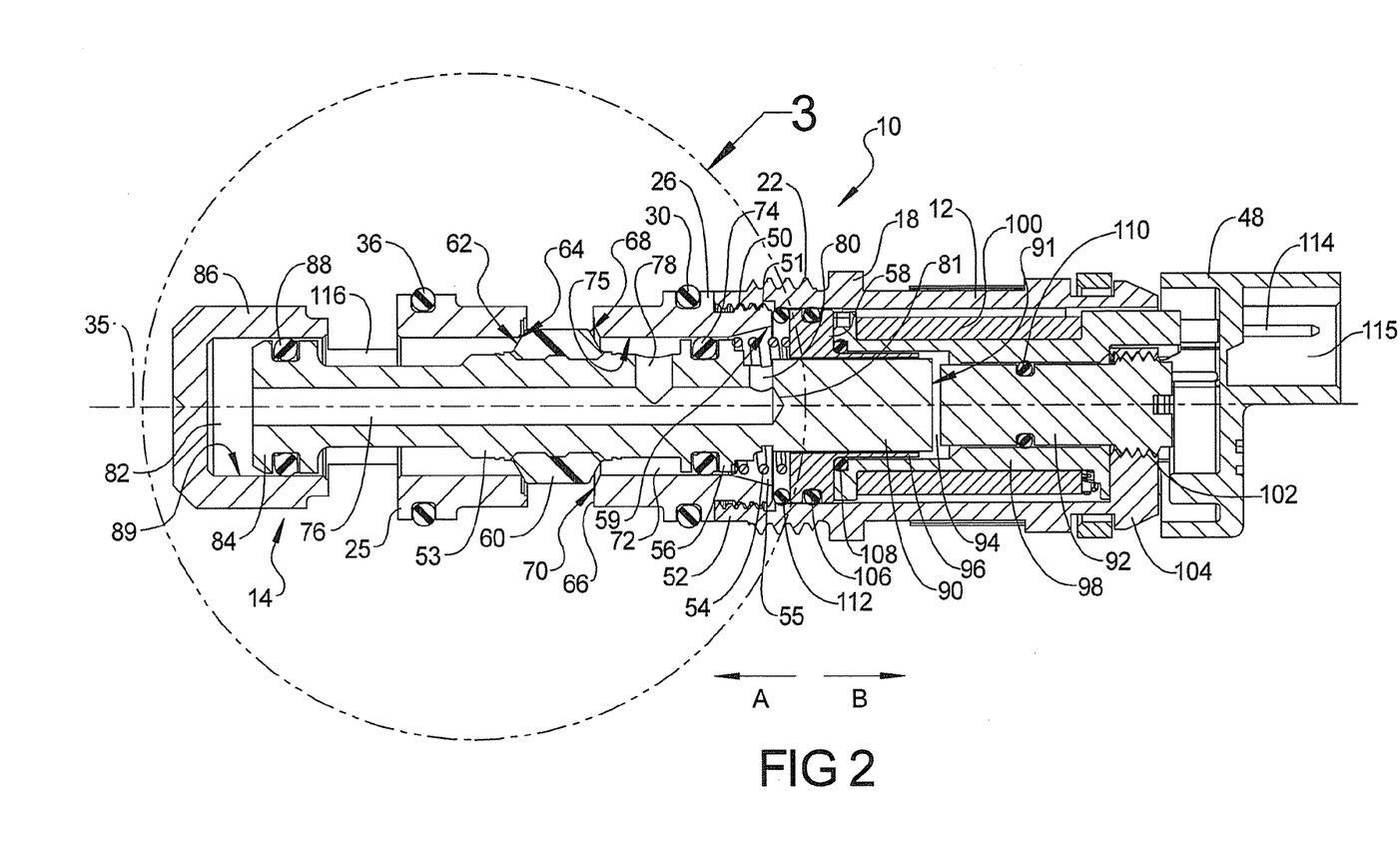
FIG. 2 is a cross sectional side elevational view taken at section 2 of FIG. 1.

Biasing member 54 is positioned in a biasing member chamber 55. Biasing member 54 is positioned between each of a shoulder 56 of valve member 53 and a bushing 58 which is slidably received within solenoid portion 12. Biasing member chamber 55 is located proximate to body extension 52 of solenoid portion 12 on an interior facing side 59 of body 25. Bushing 58 slidably receives and axially guides a portion of valve member 53 during displacement.

Valve member 53 further includes a resilient valve element 60, made for example from an elastically resilient material such as a polymeric material or rubber which is fixed in an over-molding process to an outer diameter of valve member 53. Resilient valve element 60 is shaped during molding or by machining to provide a valve element first side 62. In the valve closed position valve element first side 62 is in direct contact with a circumferential first valve seat 64 of body 25. In the valve closed position, a pressurized fluid such as air which is present at an inlet port 66 of body 25 can enter body 25 in the open passage provided between a valve element second side 68 of resilient valve element 60 and a second valve seat 70. The pressurized fluid at inlet port 66 can thereby enter a first fluid cavity 72 of body 25. First fluid cavity 72 is bounded by a valve member first seal member 74, such as an O-ring or a D-ring, which creates a resilient seal between valve member 53 and an inner wall 75 of body 25.

In order to balance the pressure forces acting on valve member 53 to permit valve member 53 to slide in either of the first or second displacement directions "A" or "B", valve member 53 further includes an axial pressure equalizing passage 76 which is in constant fluid communication with first fluid cavity 72 via an inlet passage 78. According to several embodiments, inlet passage 78 is oriented substantially perpendicular to pressure equalizing passage 76 which is coaxially aligned with respect to bore longitudinal axis 35. Pressure equalizing passage 76 is also in constant fluid communication with biasing member chamber 55 via a chamber connecting passage 80. According to several embodiments, chamber connecting passage 80 is also oriented substantially perpendicular with respect to pressure equalizing passage 76, and therefore to bore longitudinal axis 35.

According to several embodiments pressure equalizing passage 76 does not extend entirely through valve member 53 but ends proximate to shoulder 56 and more specifically immediately beyond chamber connecting passage 80 at a passage end wall 81. At an opposite or second end of pressure equalizing passage 76 with respect to chamber connecting passage 80, pressure equalizing passage 76 opens into a piston chamber 82 which slidably receives a piston 84 defining an end of valve member 53. Piston chamber 82 is created within a cylinder head 86 defining a free end of body 25. A valve member second seal member 88, such as an O-ring or D-ring, is provided to create a sliding fluid seal between piston 84 and an inner wall 89 of piston chamber 82 while allowing a sliding motion of piston 84 within piston chamber 82.

A valve member armature 90 is also integrally provided with valve member 53, with armature 90 defining a first end and piston 84 defining a second end of valve member 53. According to several embodiments, valve member 53, including armature 90 and piston 84 are created from a single piece of material machined or formed such that no connecting joints are required throughout valve member 53. Armature 90 is magnetically attracted to and an end face 91 of armature 90 moves toward a retained pole piece 92 when solenoid portion 12 is energized. A gap 94 is normally provided between end face 91 of armature 90 and pole piece 92 in the valve closed position.

With continuing reference to FIGS. 1 and 2, when the solenoid valve assembly 10 is in the valve closed position shown, the substantially contaminant-free pressurized fluid at inlet port 66 enters and pressurizes first fluid cavity 72, inlet passage 78, pressure equalizing passage 76, chamber connecting passage 80, biasing member chamber 55, piston chamber 82, and flows past the perimeter of valve member armature 90 within bushing 58 into the area of gap 94. This continuously pressurized condition, with pressure maintained above atmospheric pressure, mitigates against contaminants that may be present at fluid discharge passage 40 from subsequently entering pressure equalizing passage 76 or biasing member chamber 55 and reaching any of the solenoid components of solenoid portion 12. Also, in the valve closed position the fluid pressure distributed by pressure equalizing passage 76 is equally and oppositely pressure balanced at the opposite first and second ends of valve member 53, such that only the biasing force of biasing member 54 is required to move valve member 53 in the first displacement direction "A" or to retain valve member 53 in the valve closed position. This will be explained in greater detail in reference to both FIGS. 3 and 4.

Valve member armature 90 is slidably disposed within bushing 58 to help maintain an axial alignment of valve member 53 during its sliding motion in either of the first or second displacement directions "A" or "B". To move valve member 53 away from the valve closed position, electrical energy is provided to solenoid portion 12, creating a magnetic field through pole piece 92 which magnetically acts through and attracts armature 90. When the magnetic field is applied through pole piece 92, valve member 53 is magnetically displaced in the second displacement direction "B" until end face 91 of armature 90 either contacts or approaches pole piece 92, thereby reducing or closing gap 94. At this time, valve element second side 68 of resilient valve element 60 contacts second valve seat 70 thereby isolating the pressurized fluid at inlet port 66 from first fluid cavity 72.

To further assist in axial displacement of valve member 53, valve member armature 90 is slidably received within a bushing sleeve 96 which axially extends from bushing 58. A clearance gap is maintained between bushing sleeve 96 and valve member armature 90 to permit pressurized fluid to flow past armature 90 into gap 94. Bushing sleeve 96 is slidably received within a coil retainer 98 positioned within solenoid portion 12. Coil retainer 98 provides a coil 100 as a winding of electrical wire which when energized induces the magnetic field through pole piece 92. An axial position of pole piece 92 is adjustable by rotation of pole piece 92 with respect to pole piece threads 102 threadably received in a body head 104 of solenoid portion 12. This axial displacement of pole piece 92 allows the operator to adjust a width of gap 94 to control a closing or opening time of solenoid valve assembly 10, and further to adjust for wear of resilient valve element 60 during the operating life of solenoid valve assembly 10.

In order to further help mitigate against contaminants such as oil or particulate matter, which may be in the fluid at a discharge connection such as fluid discharge passage 40 of manifold 16, from entering pressure equalizing passage 76 and reaching the solenoid components, solenoid valve assembly 10 further includes a plurality of seals, such as O-rings or D-rings, isolating potential fluid passages between solenoid portion 12 and valve member portion 14. These seals include a bushing seal 106 positioned between bushing 58 and body extension 52, a coil retainer seal 108 positioned between bushing 58 and coil retainer 98, a pole piece seal 110 positioned between pole piece 92 and coil retainer 98, and an elastic spacer 112 which is positioned between bushing 58 and an end of body 25. Elastic spacer 112 is not received in a defined slot or cavity but is freely positioned to act as an elastic rebound member between body 25 and bushing 58. Elastic spacer 112 also provides an additional sealing capability between body 25 and bushing 58 when contacted by both.

According to several embodiments, at least one connector pin 114 is provided in electrical connection portion 48 to provide electrical energy to coil 100. Connector pin 114 is positioned in a connector cavity 115 which is sized to frictionally receive an electrical connector (not shown) which further insulates connector pin 114 from its ambient environment. When electrical energy is provided through connector pin 114 to coil 100, the magnetic field generated through pole piece 92 attracts valve member armature 90 and thereby displaces valve member 53 in the second displacement direction "B", which opens a flow path through valve member portion 14 between inlet port 66 and an outlet port 116.

Figure 3:
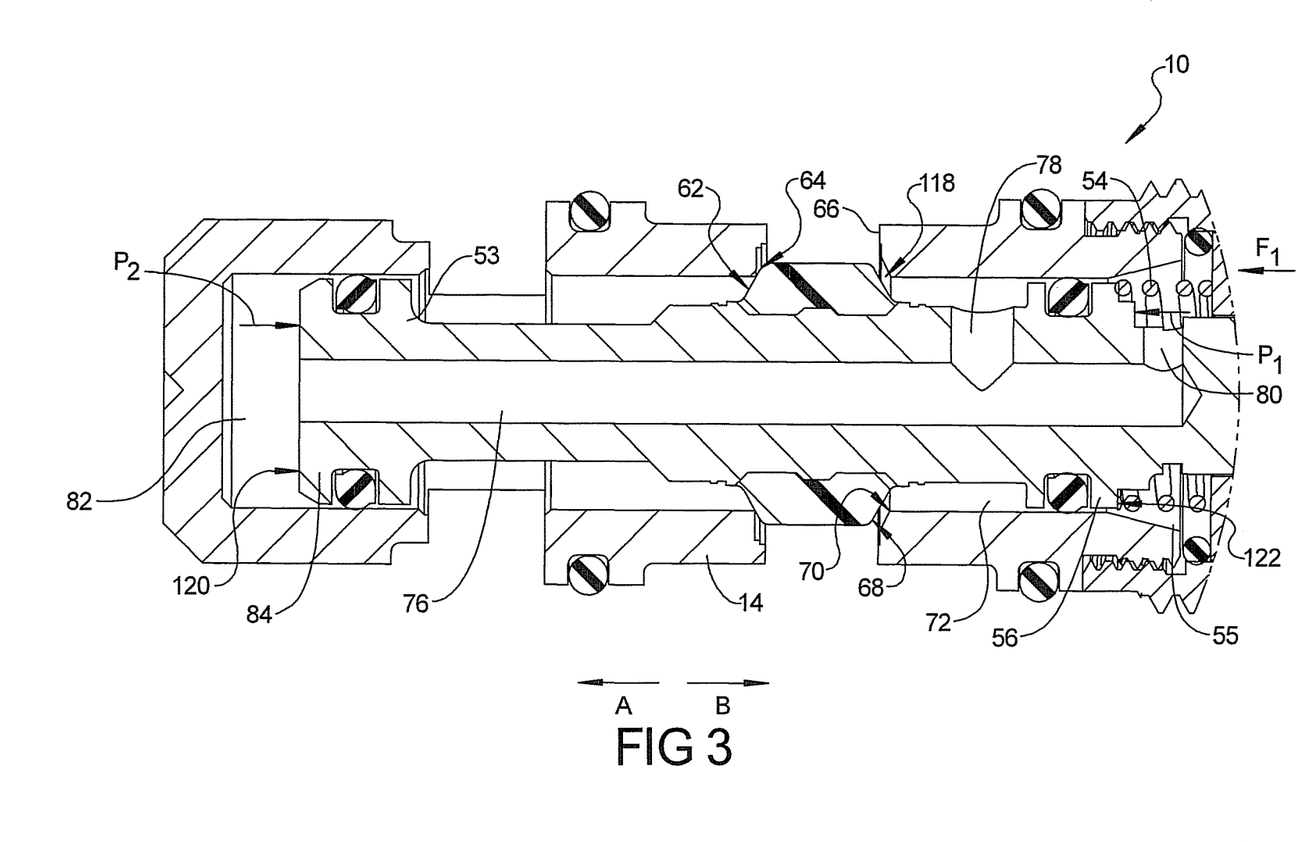
FIG. 3 is a cross sectional front elevational view taken at area 3 of FIG. 2 showing the valve member in a valve closed position.

Referring to FIG. 3, as previously noted the internal geometry of body 25 and the geometry of valve member 53 provide a pressure balanced condition in the valve closed position shown. With valve element first side 62 in contact with first valve seat 64, pressurized fluid at inlet port 66 is permitted to enter between valve element second side 68 and second valve seat 70 through a first passageway 118 between these two members. This pressurized fluid enters first fluid cavity 72 and through the flow paths previously described using pressure equalizing passage 76 to reach each of piston chamber 82 and oppositely to biasing member chamber 55 and gap 94. A surface area $C_1$ of shoulder 56 plus the area of end face 91 of armature 90 in gap 94 is substantially equal to a surface area $C_2$ of piston 84 at a piston end face 120 such that pressure forces acting in biasing member chamber 55 and gap 94 are balanced with respect to oppositely acting pressure forces acting in piston chamber 82.

For example, a first pressure force "$P_1$" of the pressurized fluid in biasing member chamber 55 and gap 94 acting in the first displacement direction "A" against shoulder 56 and valve member armature 90 is balanced by an oppositely directed second pressure force "$P_2$" from the pressurized fluid in piston chamber 82 acting in the second displacement direction "B" against piston end face 120 plus the end wall 81 of pressure equalizing passage 76. Because first pressure force "$P_1$" is substantially equal to second pressure force "$P_2$", the net force acting on valve member 53 is a first biasing force "$F_1$" created by biasing member 54 which acts in the first displacement direction "A". The pressure balanced condition of valve member 53 in the valve closed position allows valve member 53 to be displaced in the second displacement direction "B" to open solenoid valve assembly 10 using only the force generated by the solenoid components which only need to overcome first biasing force "$F_1$" plus the static friction forces acting on valve member 53 including from the various seal members.

Figure 4:
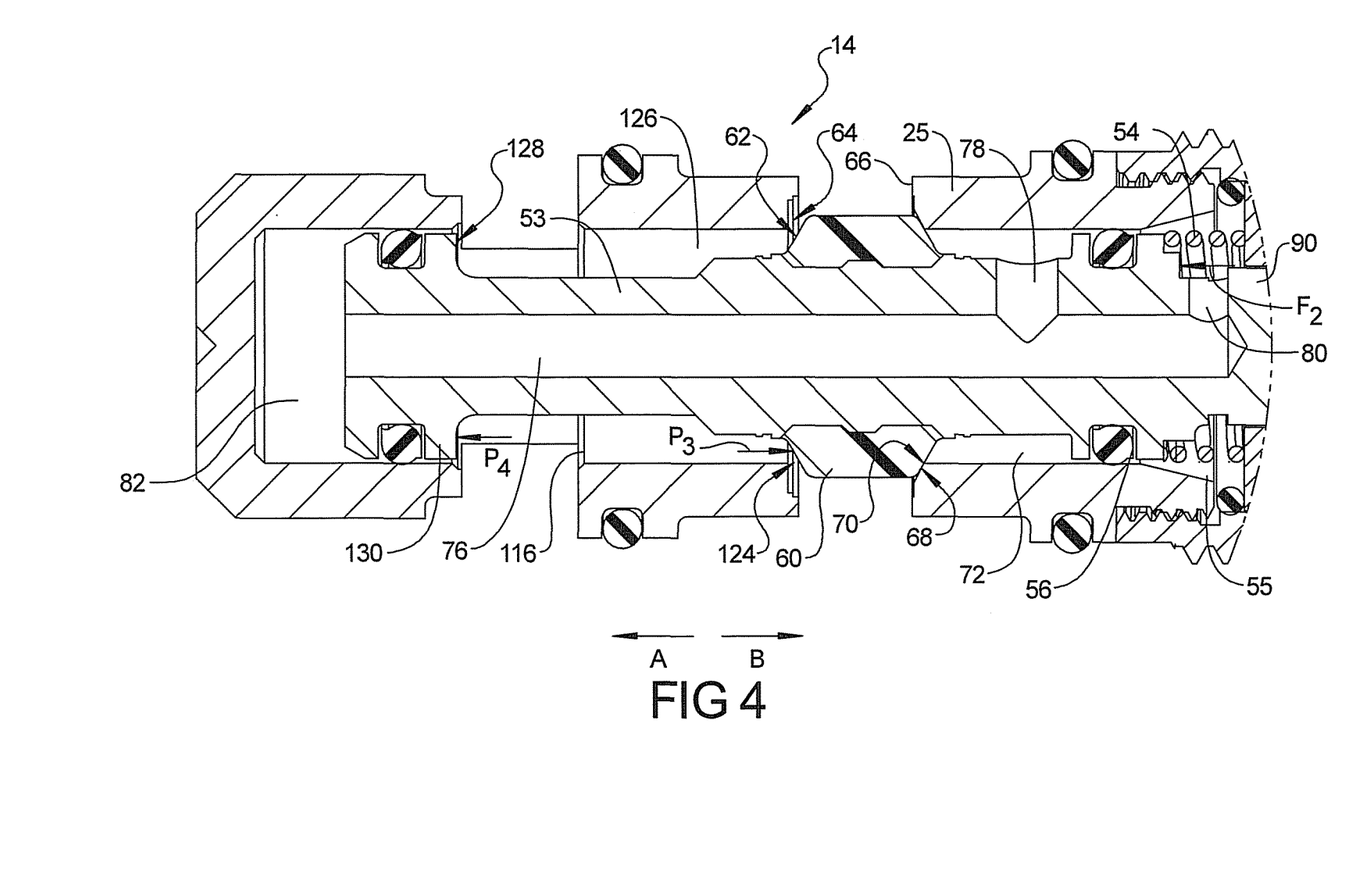
FIG. 4 is a cross sectional front elevational view similar to FIG. 3 further showing the valve member in a valve open position.

Referring to FIG. 4, valve member 53 is shown following displacement in the second displacement direction "B" to a valve open position. To displace valve member 53, coil 100 is energized thereby creating a magnetic field through pole piece 92 which magnetically attracts armature 90 and thereby valve member 53 toward pole piece 92 in the second displacement direction "B". In the valve open position, valve element second side 68 is in contact with second valve seat 70 and a second fluid passageway 124 is therefore created between valve element first side 62 and first valve seat 64. Pressurized fluid at inlet port 66 enters a second fluid cavity 126 and discharges via outlet port 116. Contaminants which may be present in outlet port 116 are normally prevented from entering piston chamber 82, pressure equalizing passage 76, biasing member chamber 55, or gap 94 by the substantially contaminant-free pressurized fluid normally present in these areas.

With continuing reference to both FIGS. 3 and 4, the net pressure forces acting on valve member 53 in the valve open position are also balanced. When valve member 53 is in the valve open position, pressure forces are balanced between first fluid cavity 72, which is isolated from inlet port 66, and piston chamber 82 via pressure equalizing passage 76. The pressure forces of the pressurized fluid entering second fluid cavity 126 via second passageway 124 act in opposing directions within second fluid cavity 126. These pressure forces include a third pressure force "$P_3$" acting in the second displacement direction "B" against valve element first side 62, and an oppositely directed fourth pressure force "$P_4$" acting against a piston flange face 128 of a piston flange 130 in the first displacement direction "A". Because third pressure force "$P_3$" is substantially equal to fourth pressure force "$P_4$", the magnetic field acting through pole piece 92 only needs to provide sufficient magnetic force to initially overcome first biasing force "F1" of biasing member 54 plus the static friction forces of the valve seals to initiate movement of valve member 53, and then to overcome the increased second biasing force "$F_2$" of the further compressed biasing member 54 to hold the valve member 53 in the valve open position. Once the magnetic field force generated by coil 100 through pole piece 92 is removed, second biasing force "$F_2$" acts to return valve member 53 in the first displacement direction "A" to the valve closed position.

Referring again to FIGS. 2-4, the flow passages provided by pressure equalizing passage 76, inlet passage 78, and chamber connecting passage 80 provide for pressure balanced conditions of valve member 53 in both the valve closed and valve open positions. The geometry of pressure equalizing passage 76 is modified according to the present disclosure from commonly used or known pressure equalizing passages by the creation of chamber connecting passage 80 which obviates the need to extend pressure equalizing passage 76 through an entire axial length of valve member 53, including through valve member armature 90. Because pressure above atmospheric pressure is maintained in piston chamber 82 and in both biasing member chamber 55 and gap 94, contaminants which may enter outlet port 116 do not enter those portions of solenoid valve assembly 10 proximate to pole piece 92.

The continuously pressurized condition using substantially contaminant-free fluid at inlet port 66 to maintain pressurized fluid in biasing member chamber 55, gap 94 and piston chamber 82 maintains the cleanliness of solenoid valve assembly 10 and precludes the sticking problems associated with solenoid operated valves having pressure equalizing passages extending entirely through the valve member. Any contaminants which are present in outlet port 116 are substantially blocked by the pressurized fluid and isolated by the various seals previously described herein, and are therefore kept away from pole piece 92, bushing sleeve 96, coil retainer 98 and coil 100.

Referring to FIG. 5 and again to FIG. 2, according to additional aspects, a solenoid valve assembly 132 is modified from solenoid valve assembly 10, therefore only the differences will be further discussed. Solenoid valve assembly 132 includes a valve member portion 134 having a slidably disposed valve member 136. Valve member 136 is modified from valve member 53 to provide a pressure equalizing passage 138 that extends entirely throughout a length of valve member 136, therefore extending from a piston 140 through an armature 142 and communicating with a gap 144 provided between an end face 146 of armature 142 and pole piece 92'.

Figure 5:
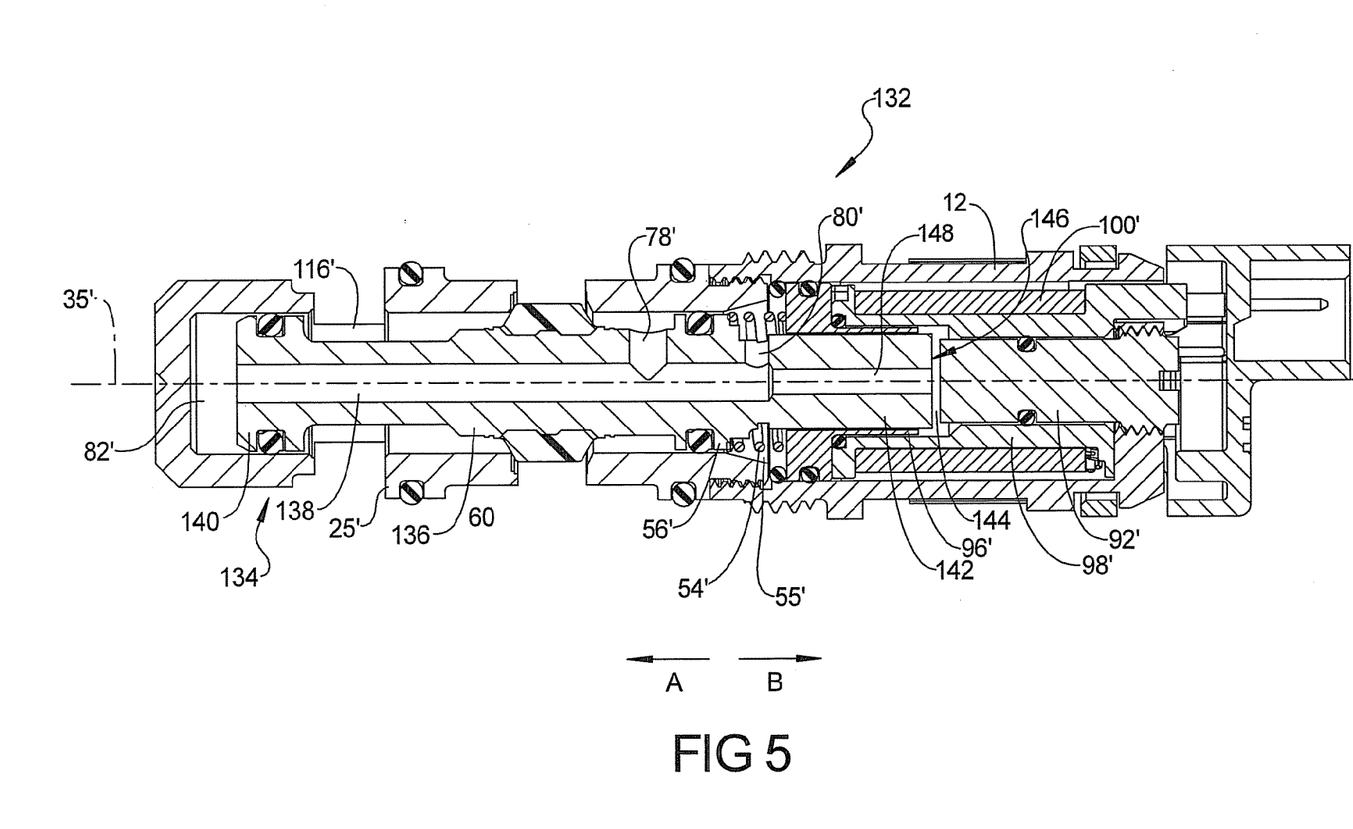
FIG. 5 is a cross sectional side elevational view similar FIG. 2, showing an additional aspect of a valve member of the present disclosure.

Similar to valve member 53, the inlet passage 78' is oriented substantially perpendicular to pressure equalizing passage 138 and is coaxially aligned with respect to a bore longitudinal axis 35'. Pressure equalizing passage 76', similar to pressure equalizing passage 76, is also in constant fluid communication with a biasing member chamber 55' via a chamber connecting passage 80'. An armature portion 148 of pressure equalizing passage 138 provides for more rapid displacement of pressurized fluid into gap 144 than provided via valve member 53 that required pressurized fluid to flow between the inner wall of a bushing sleeve 96' and armature 142 to reach gap 144.

Operation of solenoid valve assembly 132 is substantially the same as operation of solenoid valve assembly 10 and similarly provides a pressure balanced condition of valve member 136 in both a valve closed position (shown in FIG. 2) and a valve open position (similar to FIG. 4). Solenoid valve assembly 132, like solenoid valve assembly 10, has flow paths that maintain an above-atmospheric pressure using the pressurized fluid in a piston chamber 82', the biasing member chamber 55' and the gap 144 at all times and at both valve open and closed positions. Therefore, solenoid valve assembly 132, like solenoid valve assembly 10, similarly prevents contaminants present at an outlet port 116' from entering piston chamber 82', biasing member chamber 55' and/or gap 144, and thereby prevents contaminants present at outlet port 116' from entering or being exposed to pole piece 92', bushing sleeve 96', a coil retainer 98' and/or a coil 100' of solenoid portion 12, which can be configured and operated substantially the same as solenoid portion 12 of solenoid valve assembly 10.

Referring to FIG. 6 and again to FIGS. 2 and 5, according to additional aspects, a solenoid valve assembly 150 is modified from solenoid valve assembly 132, therefore only the differences will be further discussed. Solenoid valve assembly 150 includes a valve member portion 152 having a slidably disposed valve member 154. Valve member 154 is modified from valve member 136 to omit the chamber connecting passage 80'. The pressure equalizing passage 138' extends entirely throughout a length of valve member 154, and therefore extends from piston 140' through an armature 142' and communicates with a gap 144' provided between an end face 146' of armature 142' and pole piece 92'. Pressurized fluid is directed into a biasing member chamber 156 having biasing member 54' via a different flow path than with solenoid valve assembly 132. Pressurized fluid entering inlet passage 78' flows through pressure equalizing passage 138' into gap 144', and then between armature 142' and an inner wall 158 of bushing 58' to reach biasing member chamber 156. Solenoid valve assembly 150 is pressure balanced in each of the valve open and closed positions similar to the previously described solenoid valve assemblies 10, 132. Pressurized fluid is also continuously present at both first end (in gap 144' and biasing member chamber 156) and second ends (in piston chamber 82') of valve member 154 in both of the valve open and closed positions. A diameter of an armature portion 160 of pressure equalizing passage 138' can be predetermined/minimized to maximize the exposed area of end face 146' of armature 142', thereby maximizing the magnetic attraction force acting on armature 142' when coil 100' is energized.

Referring in general to FIGS. 1-6, pressure balanced solenoid operated valves 10, 132, 150 include solenoid portion 12 having coil 100 positioned in coil retainer 98. Valve member portion 14 includes body 25 connected to the solenoid portion 12. Valve member 53, 136, 154 is slidably disposed in the body 25. Valve member 53, 136, 154 includes opposed first and second ends (armature 90 and piston 84) and shoulder 56 between the first and second ends. The first end (armature 90, 142, 142') when the coil 100 is energized is magnetically drawn toward the coil retainer 98 thereby moving the valve member 53, 136, 154 in the second displacement direction "B" between the valve closed and the valve open positions. Conversely, when the coil 100 is de-energized the first end (armature 90, 142, 142') and valve member 53, 136, 154 are moved by the biasing force of biasing member 54, 54' in the first displacement direction "A" away from coil retainer 98, thereby moving the valve member 53, 136, 154 between the valve open and the valve closed positions. Pressure equalizing passage 76, 138, 138' extends internally and axially into the valve member 53, 136, 154 from the second end (piston 84) and for valve member 53 ends at the passage end wall 81 of valve member 53 prior to reaching the first end (armature 90), or extends entirely through the valve members 136, 154. Inlet passage 78 communicates a pressurized fluid (such as air) to the pressure equalizing passage 76, 138, 138'.

Figure 6:
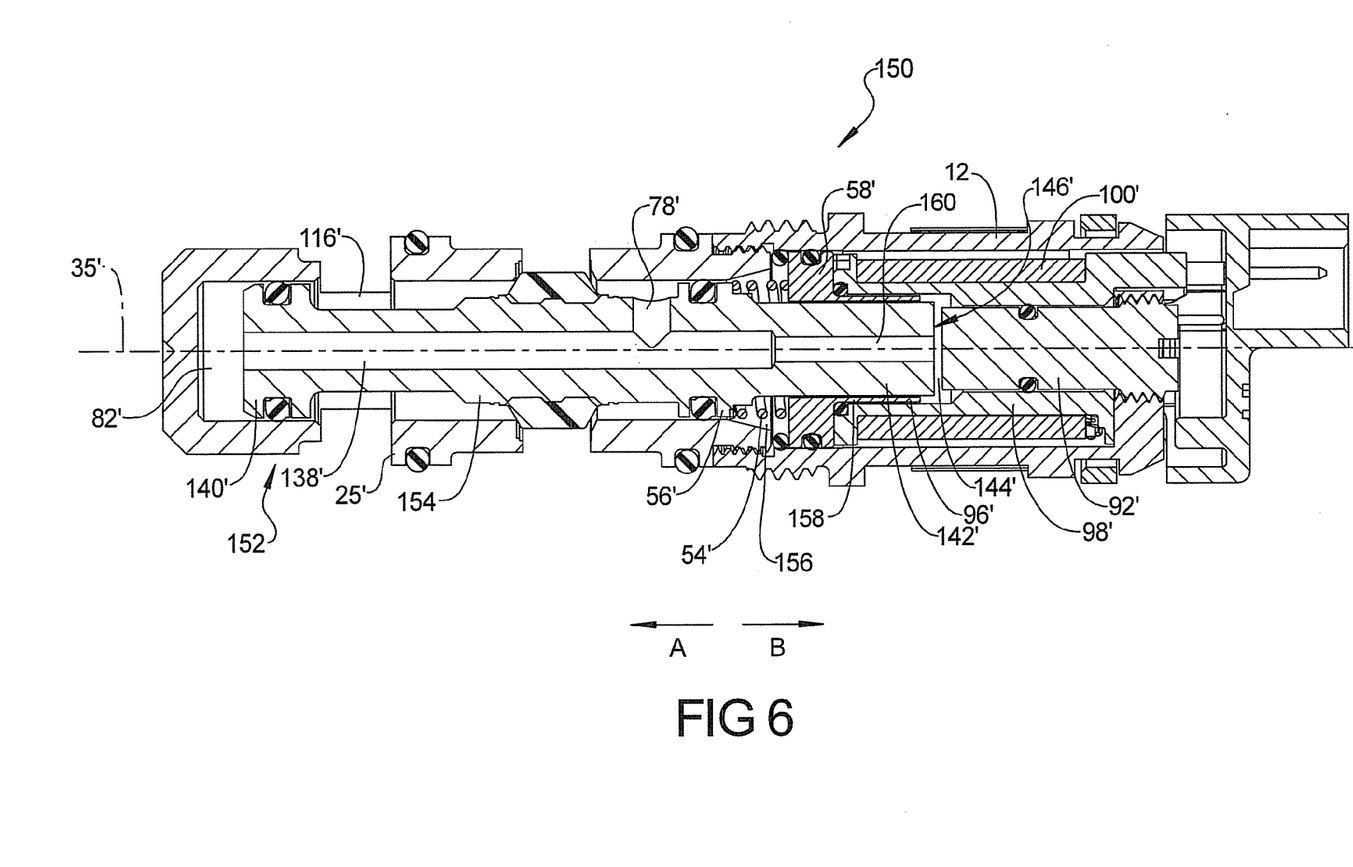
FIG. 6 is a cross sectional side elevational view similar FIG. 5, showing a further aspect of a valve member of the present disclosure.

The diameters and/or lengths of the inlet passages 78, 78' and the chamber connecting passages 80, 80' in the embodiments of FIGS. 2 and 5, and the diameter and/or length of inlet passage 78' in FIG. 6 can differ either between the embodiments or within any of the embodiments, or be equivalent for the different embodiments. Similarly, the diameter of the pressure equalizing passages 76, 138, 138' in the embodiments of FIGS. 2, 5 and 6 can also differ or be equivalent for the different embodiments. These features will be predetermined based on parameters such as valve size, fluid controlled by the valve, required valve operating or cycle time, and the like. In addition, although air is identified herein as an exemplary pressurized fluid, the valve designs of the present disclosure can also be used for other fluids, including liquid or gaseous states.

In solenoid operated valves 10, 132 chamber connecting passage 80 communicates the pressurized fluid from the pressure equalizing passage 76, 138 to the biasing member chamber 55, 55' and the shoulder 56. Chamber connecting passage 80 is omitted in solenoid operated valves 150. The pressurized fluid delivered via the pressure equalizing passage 76, 138, 138' acts against the second end (piston 84) and equally and oppositely against both valve member armature 90 (at the end face 91 of valve member armature 90, 142, 142' in gap 94, 144, 144') and the shoulder 56, and further prevents contaminant entry via the piston chamber 82 or pressure equalization passage 76, 138, 138' to the valve member armature 90, 142, 142' and the coil 100.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A pressure balanced solenoid operated valve, comprising:
   a solenoid portion having a coil positioned in a coil retainer;
   a valve member portion having a body connected to the solenoid portion; and
   a valve member slidably disposed in the body, the valve member having:
      an armature defining a first end of the valve member, a piston defining a second end of the valve member, and a shoulder positioned between the armature and the piston, the armature when the coil is energized being magnetically drawn toward the coil retainer to move the valve member between a valve closed and a valve open position;
      a valve element extending outwardly from the valve member at a position located between the piston and the shoulder;
      a pressure equalizing passage open at the piston and extending internally within the valve member;
      an inlet passage extending through the valve member to open into the pressure equalizing passage, the inlet passage disposed between the valve element and the shoulder; and
      a connecting passage extending through the valve member to open into the pressure equalizing passage, the connecting passage disposed between the shoulder and the first end of the valve member, whereby a pressurized fluid transferred via the inlet passage, the pressure equalizing passage, and the connecting passage acts against the piston and equally and oppositely against the both the shoulder and the armature to provide a pressure balanced condition in both the valve closed and valve open positions.

2. The pressure balanced solenoid operated valve of claim 1, further including a biasing member chamber created between the solenoid portion and the valve member portion having a biasing member positioned therein acting in contact with the shoulder to continuously bias the valve member away from the solenoid portion toward the valve closed position.

3. The pressure balanced solenoid operated valve of claim 2, further including:
   a piston chamber of the body having the piston slidably received therein, the pressurized fluid being distributed via the pressure equalizing passage to both the biasing member chamber and the piston chamber;
   wherein both the biasing member chamber and the piston chamber are continuously pressurized at both the valve open and closed positions.

4. The pressure balanced solenoid operated valve of claim 2, wherein the connecting passage extends between the pressure equalizing passage and the biasing member chamber.

5. The pressure balanced solenoid operated valve of claim 1, wherein the pressure equalizing passage ends at a passage end wall within the valve member proximate the armature.

6. The pressure balanced solenoid operated valve of claim 1, wherein the pressure equalizing passage extends entirely through the valve member including through the armature.

7. The pressure balanced solenoid operated valve of claim 1, further including:
   a first fluid cavity between the body and the valve member open via a valve inlet port to a source of the pressurized fluid in the valve closed position, the inlet passage providing fluid communication between the pressure equalizing passage and the first fluid cavity; and
   a first pressure force from the pressurized fluid acting on both the shoulder and an end face of the armature being equally and oppositely balanced with respect to a second pressure force from the pressurized fluid acting on the piston.

8. The pressure balanced solenoid operated valve of claim 1, wherein the inlet passage provides fluid communication between the pressure equalizing passage and a first fluid cavity of the body in fluid communication with a valve inlet port in the valve closed position.

9. The pressure balanced solenoid operated valve of claim 1, wherein the solenoid portion further includes a pole piece, the pole piece axially adjustable providing an adjustable length gap between the armature and the pole piece in the valve closed position, the pressurized fluid being continuously present in the gap in either the valve open or valve closed positions.

10. The pressure balanced solenoid operated valve of claim 1,
    wherein the valve element includes a resilient material that is fixedly overmolded onto the valve member between the piston and the shoulder and such that the valve element has first and second sides and wherein opposed first and second valve seats are created in the body, the first side of the valve element contacting the first valve seat in the valve closed position and the second side of the valve element contacting the second valve seat in the valve open position.

11. The pressure balanced solenoid operated valve of claim 1, further including a biasing member acting against the shoulder to continuously bias the valve member toward the valve closed position.

12. The pressure balanced solenoid operated valve of claim 1, wherein the shoulder extends outwardly from the valve member and is disposed in sliding contact with the body of the valve member portion and wherein the armature, the piston, and the shoulder are all integrally connected without connecting joints to create the valve member, the valve member being a magnetically effected material.

13. The pressure balanced solenoid operated valve of claim 1, further including:
    a bushing positioned in the solenoid portion and slidably receiving the armature of the valve member; and
    an elastic spacer positioned between the body and the coil retainer, the elastic spacer continuously biasing the bushing toward the coil retainer.

14. A pressure balanced solenoid operated valve, comprising:
    a solenoid portion having a coil positioned in a coil retainer;
    a valve member portion defining a body connected to the solenoid portion;
    a valve member slidably disposed in the body, the valve member having:
       opposed first and second ends, an outer surface extending between the first and second ends, and a shoulder positioned along the outer surface of the valve member between the first and second ends, wherein the first end is magnetically drawn toward the coil retainer when the coil is energized thereby moving the valve member between a valve closed and a valve open position;
       a valve element disposed along the valve member between the piston and the shoulder;
       a pressure equalizing passage extending internally and axially in the valve member from the second end;

an inlet passage positioned between the valve element and the shoulder and extending through the valve member from the outer surface to the pressure equalizing passage; and
a connecting passage positioned between the shoulder and the first end of the valve member and extending through the valve member from the outer surface to the pressure equalizing passage.

15. The pressure balanced solenoid operated valve of claim 14, wherein the body of the valve member portion includes an inlet port and wherein the inlet passage provides fluid communication between the pressure equalizing passage and a first fluid cavity of the body, the first fluid cavity of the body being in fluid communication with the inlet port when the valve member is in the valve closed position.

16. The pressure balanced solenoid operated valve of claim 15, wherein the body includes an outlet port and a second fluid cavity extending between the inlet and outlet ports, the outlet port being in fluid communication with the inlet port via the second fluid cavity when the valve member is in the valve open position.

17. The pressure balanced solenoid operated valve of claim 16, wherein the piston and the valve member portion define a piston chamber adjacent the second end of the valve member and wherein the piston chamber is isolated from the second fluid cavity in both the valve open and closed positions such that the pressurized fluid stays in the pressure equalizing passage in both the valve closed and valve open positions to create a continuously pressurized condition in the pressure equalizing passage that prevents contaminants present at the outlet port from moving into the pressure equalizing passage due to a lack of pressurized fluid flow in the pressure equalizing passage resulting from the continuously pressurized condition.

18. The pressure balanced solenoid operated valve of claim 16, wherein the pressure equalizing passage is open to the inlet port in the valve closed position and is isolated from both the inlet and outlet ports in the valve open position such that the pressurized fluid stays in the piston chamber and the biasing member chamber in both the valve open and closed positions.

19. The pressure balanced solenoid operated valve of claim 14, wherein the pressure equalizing passage ends at a passage end wall prior to reaching the first end of the valve member.

20. The pressure balanced solenoid operated valve of claim 14, wherein the pressure equalizing passage extends entirely through the valve member including through the first end of the valve member.

21. The pressure balanced solenoid operated valve of claim 16, further including a first seal member provided at the first end and a second seal member provided at the second end, the first and second seal members retaining the pressurized fluid in the pressure equalizing passage in both the valve closed and valve open positions after the inlet port is initially pressurized to create a continuously pressurized condition in the pressure equalizing passage that prevents contaminants present at the outlet port from moving into the pressure equalizing passage and subsequently into the solenoid portion due to a lack of pressurized fluid flow in the pressure equalizing passage after the pressurized fluid enters the pressure equalizing passage when the inlet port is initially pressurized.

22. A pressure balanced solenoid operated valve, comprising:
a solenoid portion having a pole piece;
a valve member portion, including:
an inlet port for receiving a pressurized fluid from a source; and
a valve member slidably disposed in the valve member portion for movement between a valve open position and a valve closed position, the valve member having:
an armature defining a first end of the valve member, a piston defining a second end of the valve member, and a shoulder positioned between the armature and the piston proximate to the armature;
a resilient valve element connected to the valve member between the piston and the shoulder;
a pressure equalizing passage extending axially through the valve member from the piston to the shoulder and blocked from extending through the armature by a passage end wall; and
an inlet passage located between the resilient valve element and the shoulder and extending into the valve member between the pressure equalizing passage and a first fluid cavity to provide fluid communication directly between the first fluid cavity and the pressure equalizing passage, wherein the first fluid cavity is disposed about the valve member and extends between the shoulder and the resilient valve element, and wherein the inlet port opens into the first fluid cavity when the valve member is in the valve closed position;
whereby after a pressurized fluid enters each of the first fluid cavity and the pressure equalizing passage in the valve closed position the pressurized fluid is retained in the pressure equalizing passage and the inlet passage in both the valve open and valve closed positions.

23. The pressure balanced solenoid operated valve of claim 22, further including:
a biasing member chamber created between the valve member portion and the solenoid portion; and
a biasing member positioned in the biasing member chamber acting against the shoulder to continuously bias the valve member toward the valve closed position.

24. The pressure balanced solenoid operated valve of claim 23, further including a chamber connecting passage providing communication between the pressure equalizing passage and the biasing member chamber.

25. The pressure balanced solenoid operated valve of claim 23, wherein pressurized fluid in the first fluid cavity is distributed by the inlet passage to both the biasing member chamber and a piston chamber of the valve member portion, the piston chamber of the valve member portion having the piston slidably disposed therein.

26. The pressure balanced solenoid operated valve of claim 22, wherein a first pressure force from the pressurized fluid acting on both the shoulder and the armature is equally and oppositely balanced with respect to a second pressure force from the pressurized fluid acting on the piston in the valve closed position in both the valve open and closed positions.

27. The pressure balanced solenoid operated valve of claim 22, further including a piston chamber of the valve member portion having the piston slidably disposed therein, wherein the piston chamber and the solenoid portion are continuously pressurized in both the valve open and closed positions.

28. A pressure balanced solenoid operated valve, comprising:
a solenoid portion having a pole piece; and
a valve member portion, including:
an inlet port for receiving a pressurized fluid from a source; and
a valve member slidably disposed in the valve member portion for movement between a valve open position and a valve closed position, the valve member having:

an armature defining a first end of the valve member, a piston defining a second end of the valve member, and a shoulder positioned between the armature and the piston proximate to the armature;

a resilient valve element connected to the valve member between the piston and the shoulder;

a pressure equalizing passage extending axially and entirely through the valve member from the piston through the armature; and an inlet passage located between the resilient valve element and the shoulder and extending into the valve member between the pressure equalizing passage and a first fluid cavity to provide fluid communication directly between the first fluid cavity and the pressure equalizing passage, wherein the first fluid cavity is disposed about the valve member and extends between the shoulder and the resilient valve element, and wherein the inlet port opens into the first fluid cavity when the valve member is in the valve closed position;

whereby after a pressurized fluid enters each of the first fluid cavity and the pressure equalizing passage in the valve closed position the pressurized fluid is retained in the pressure equalizing passage and the inlet passage in both the valve open and valve closed positions.

29. The pressure balanced solenoid operated valve of claim 28, further including:

a biasing member chamber created between the valve member portion and the solenoid portion; and a biasing member positioned in the biasing member chamber acting against the shoulder to continuously bias the valve member toward a valve closed position.

30. The pressure balanced solenoid operated valve of claim 29, further including a chamber connecting passage providing communication between the pressure equalizing passage and the biasing member chamber.

31. The pressure balanced solenoid operated valve of claim 29, wherein the pressurized fluid in the first fluid cavity is distributed in a flow path extending through the pressure equalizing passage, between the armature and the pole piece, between the armature and a bushing slidably receiving the armature, and into the biasing member chamber.

32. The pressure balanced solenoid operated valve of claim 28, wherein a first pressure force from the pressurized fluid acting on both the shoulder and the armature is equally and oppositely balanced with respect to a second pressure force from the pressurized fluid acting on the piston in the valve closed position in both the valve open and closed positions.

33. The pressure balanced solenoid operated valve of claim 28, further including a piston chamber of the valve member portion having the piston slidably disposed therein, wherein the piston chamber and the solenoid portion are continuously pressurized in both the valve open and closed positions.

* * * * *

UNITED STATES PATENT AND TRADEMARK OFFICE
CERTIFICATE OF CORRECTION

| | | |
|---|---|---|
| PATENT NO. | : 9,103,463 B2 | Page 1 of 1 |
| APPLICATION NO. | : 13/396202 | |
| DATED | : August 11, 2015 | |
| INVENTOR(S) | : Kevin Williams et al. | |

It is certified that error appears in the above-identified patent and that said Letters Patent is hereby corrected as shown below:

On the title page

Item 73 Assignee Line 1 Delete "Wixon," and insert --Wixom,--, therefor

In the specification

Column 7, Line 28 Delete ""F1"" and insert --"$F_1$"--, therefor

In the claims

Column 11, Line 33 In Claim 1, after "against", delete "the" (first occurrence)

Column 12, Line 23 In Claim 10, after "shoulder", delete "and"

Signed and Sealed this
Fifth Day of January, 2016

Michelle K. Lee
*Director of the United States Patent and Trademark Office*